(12) United States Patent
Lee et al.

(10) Patent No.: US 7,675,590 B2
(45) Date of Patent: Mar. 9, 2010

(54) ARRAY SUBSTRATE, LIQUID CRYSTAL DISPLAY PANEL AND LIQUID CRYSTAL DISPLAY DEVICE HAVING THE SAME

(75) Inventors: Han-Ju Lee, Seoul (KR); Kook-Hyun Choi, Seoul (KR); Kyung-Seop Kim, Suwon-si (KR); Yong-Eui Lee, Seongnam-si (KR); Duck-Jung Lee, Cheonan-si (KR); Jae-Hong Jeon, Seongnam-si (KR); Yeong-Beom Lee, Cheonan-si (KR); Jae-Hun Chung, Suwon-si (KR); Jang-Bog Ju, Seongnam-si (KR)

(73) Assignee: Samsung Electronics, Co. Ltd, Suwon-Si (KR)

( * ) Notice: Subject to any disclaimer, the term of this patent is extended or adjusted under 35 U.S.C. 154(b) by 290 days.

(21) Appl. No.: 11/516,227

(22) Filed: Sep. 6, 2006

(65) Prior Publication Data

US 2007/0064166 A1 Mar. 22, 2007

(30) Foreign Application Priority Data

Sep. 16, 2005 (KR) ...................... 10-2005-0087031

(51) Int. Cl.
*G02F 1/1335* (2006.01)

(52) U.S. Cl. ...................................................... 349/106
(58) Field of Classification Search .................. 349/106
See application file for complete search history.

(56) References Cited

U.S. PATENT DOCUMENTS

| | | | | |
|---|---|---|---|---|
| 5,926,240 A | * | 7/1999 | Hirota et al. | 349/114 |
| 6,137,551 A | * | 10/2000 | Jeong | 349/38 |
| 6,683,667 B2 | | 1/2004 | Jin et al. | |

FOREIGN PATENT DOCUMENTS

| | | |
|---|---|---|
| CN | 1417622 | 5/2003 |
| CN | 1466703 | 1/2004 |

* cited by examiner

*Primary Examiner*—Charlie Peng
(74) *Attorney, Agent, or Firm*—F. Chau & Associates, LLC.

(57) ABSTRACT

An array substrate including a plurality of pixel regions transmitting light includes a switching element disposed in each of the pixel regions defined by gate and source lines, wherein the switching element is electrically connected to the gate and source lines, a pixel electrode electrically connected to the switching element, a first insulating layer disposed on the switching element, and a second insulating layer disposed under the first insulating layer, wherein a thickness of the second insulating layer is dependent on a peak wavelength of red light.

26 Claims, 12 Drawing Sheets

ARRAY SUBSTRATE, LIQUID CRYSTAL DISPLAY PANEL AND LIQUID CRYSTAL DISPLAY DEVICE HAVING THE SAME

CROSS-REFERENCE TO RELATED APPLICATION

This application claims priority to Korean Patent Application No. 2005-87031 filed on Sep. 16, 2005, the contents of which are herein incorporated by reference in their entireties.

BACKGROUND OF THE INVENTION

1. Technical Field

The present disclosure relates to an array substrate, and more particularly, to an array substrate capable of improving image display quality, a liquid crystal display (LCD) panel having the array substrate and an LCD device having the array substrate.

2. Discussion of the Related Art

An array substrate includes a plurality of pixel parts defined by a plurality of gate lines aligned in a first direction and a plurality of source lines aligned in a second direction substantially perpendicular to the first direction. Each of the pixel parts includes a gate electrode electrically connected to the gate lines, a switching element having a source electrode electrically connected to the source lines and a pixel electrode electrically connected to the drain electrode of the switching element. A pixel electrode is disposed on each of the pixel parts defined by the gate and source lines.

An LCD panel including the pixel part having a high opening ratio has been used to increase luminance. The pixel electrode can partially overlap the source lines to increase a size of the pixel electrode, thereby increasing the opening ratio of each of the pixel parts. Therefore, the luminance of the LCD panel can be increased.

To increase the opening ratio of each of the pixel parts, and to minimize a parasite capacitance between the pixel electrode and the source lines partially overlapping the pixel electrode, a thickness of an organic layer interposed between the pixel electrode and the source lines can be increased.

However, when the thickness of the organic layer is increased, uniformity of the thickness of the organic layer is decreased. Spot defects such as, for example, a red spot and a white spot, formed on the LCD panel can be caused by the decreased thickness uniformity.

SUMMARY OF THE INVENTION

Exemplary embodiments of the present invention provide an array substrate capable of decreasing spot defects and improving image display quality, and provide a liquid crystal display (LCD) panel and an LCD device having the array substrate.

According to an embodiment of the present invention, an array substrate including a plurality of pixel regions transmitting light comprises a switching element disposed in each of the pixel regions defined by gate and source lines, wherein the switching element is electrically connected to the gate and source lines, a pixel electrode electrically connected to the switching element, a first insulating layer disposed on the switching element, and a second insulating layer disposed under the first insulating layer, wherein a thickness of the second insulating layer is dependent on a peak wavelength of red light.

According to an embodiment of the present invention, a liquid crystal display panel for displaying an image using light comprises an array substrate including a switching element electrically connected to gate and source lines, a first insulating layer on the switching element, and a second insulating layer disposed under the first insulating layer and having a thickness depending on a peak wavelength of red light, and an opposite substrate combined with the array substrate to receive a liquid crystal layer between the array substrate and the opposite substrate.

According to an embodiment of the present invention, a liquid crystal display device comprises a light source generating light, and a liquid crystal display panel including an array substrate having a switching element electrically connected to gate and source lines, a first insulating layer on the switching element, and a second insulating layer disposed under the first insulating layer and having a thickness depending on a peak wavelength of red light, and an opposite substrate combined with the array substrate to receive a liquid crystal layer between the array substrate and the opposite substrate.

According to an embodiment of the present invention, an array substrate including a plurality of pixel regions transmitting light comprises a switching element disposed in each of the pixel regions defined by gate and source lines, wherein the switching element is electrically connected to the gate and source lines, a pixel electrode electrically connected to the switching element, a first insulating layer disposed on the switching element, and a second insulating layer disposed under the first insulating layer, a thickness of the second insulating layer being adjusted to minimize a transmissivity variation caused by a thickness variation of the first insulating layer.

BRIEF DESCRIPTION OF THE DRAWINGS

Exemplary embodiments of the present disclosure can be understood in more detail from the following description taken in conjunction with the accompanying drawings of which.

DETAILED DESCRIPTION OF EXEMPLARY EMBODIMENTS

Exemplary embodiments of the present invention will be described in more detail with reference to the accompanying drawings. The present invention may, however, be embodied in many different forms and should not be construed as limited to the embodiments set forth herein.

Figure 1:
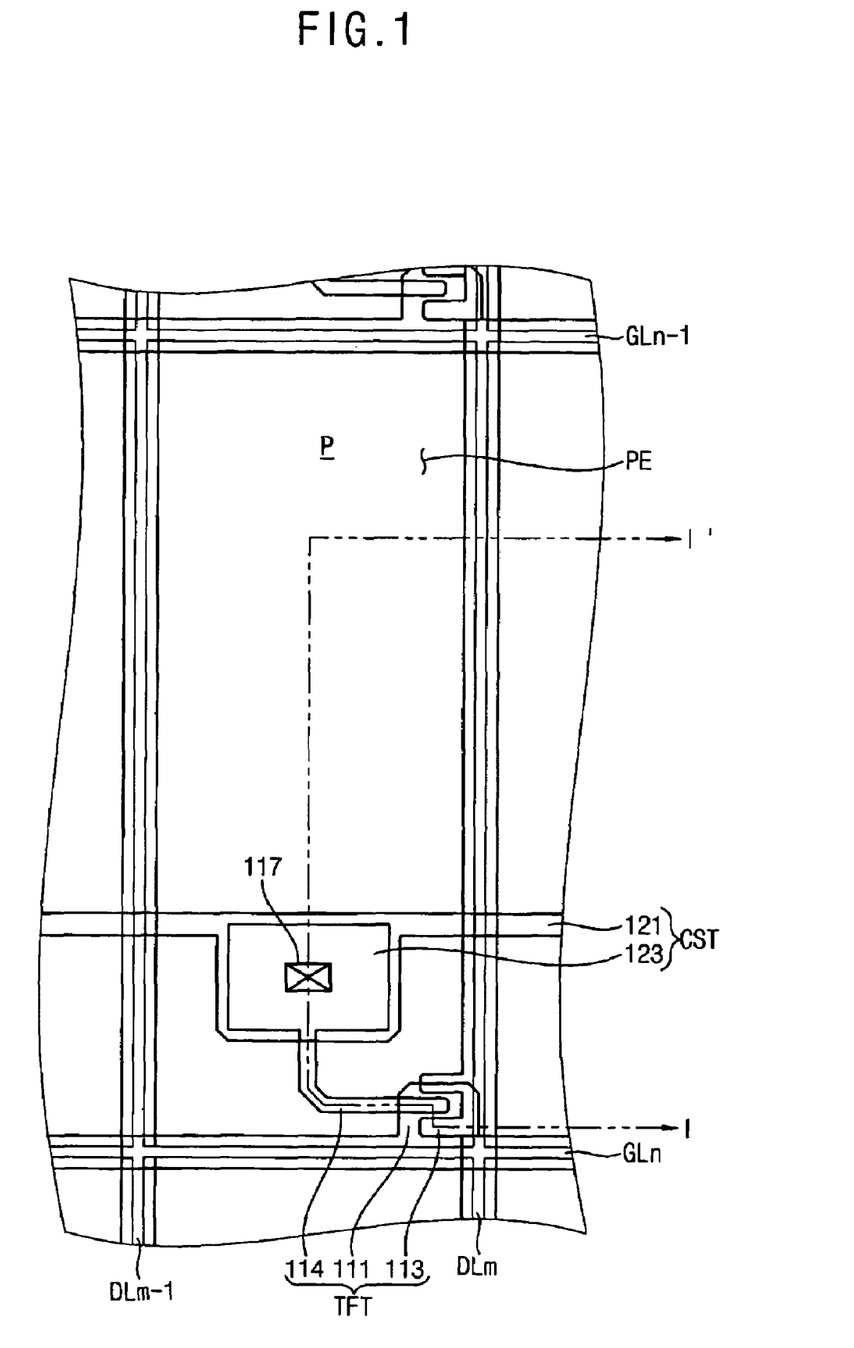
FIG. 1 is a plan view illustrating an array substrate according to an exemplary embodiment of the present invention.

FIG. 1 is a plan view illustrating an array substrate 100 according to an exemplary embodiment of the present invention.

Referring to FIG. 1, the array substrate 100 includes a plurality of gate lines GLn-1 and GLn, a plurality of source lines DLm-1 and DLm and a plurality of pixel parts P. The pixel parts P are defined by the gate lines GLn-1 and GLn and the source lines DLm-1 and DLm.

The gate lines GLn-1 and GLn are aligned in a first direction, and are extended in a second direction. The source lines DLm-1 and DLm are aligned in a second direction, and are extended in a first direction.

An n-th pixel part P includes an n-th gate line GLn, an m-th source line DLm, a switching element TFT, a storage capacitor CST and a pixel electrode PE.

The n-th gate line GLn transmits a control signal that controls an operation of the pixel part P, and the m-th source line DLm transmits a driving voltage that drives the pixel part P.

The switching element TFT includes a gate electrode 111, a source electrode 113 and a drain electrode 114. The gate electrode 111 is electrically connected to the n-th gate line GLn. The source electrode 113 is electrically connected to the source line DLm. The switching element TFT is electrically connected to the drain electrode 114 via the pixel electrode PE and a contact hole 117.

The switching element TFT applies the driving voltage to the pixel electrode PE electrically connected to the drain electrode 114 through the source electrode 113 based on the control signal that is applied to the gate electrode 111.

The storage capacitor CST includes a storage common line 121 and an electrode pattern 123. The storage capacitor CST is electrically connected to the switching element TFT and the pixel electrode PE via the electrode pattern 123.

The pixel electrode PE is defined by the gate lines GLn-1 and GLn and the source lines DLm-1 and DLm. Light provided from a bottom surface of the array substrate 100 passes through the pixel electrode PE. To increase transmissivity of the pixel part P, the pixel electrode PE can partially overlap the gate lines GLn-1 and GLn and the source lines DLm-1 and DLm.

When the pixel electrode PE partially overlaps the gate lines GLn-1 and GLn and the source lines DLm-1 and DLm to increase the transmissivity of the pixel part P, a thickness of an organic insulating layer (105 shown in FIG. 2) interposed between the source lines DLm-1 and DLm and the pixel electrode PE is increased to minimize a coupling capacitance between the pixel electrode PE and the source lines DLm-1 and DLm. When the thickness of the organic insulating layer is increased, thickness uniformity of the organic insulating layer may be decreased.

When the thickness of the organic insulating layer is changed, light transmissivity of the light L (shown in FIG. 2) may be changed. In FIG. 1, a thickness of a lower insulating layer formed under the organic insulating layer can be adjusted to increase transmissivity uniformity of the light L. For example, the thickness of the lower insulating layer is determined based on a wavelength of red light. That is, the thickness of the lower insulating layer is dependent on the wavelength of the red light.

Figure 2:
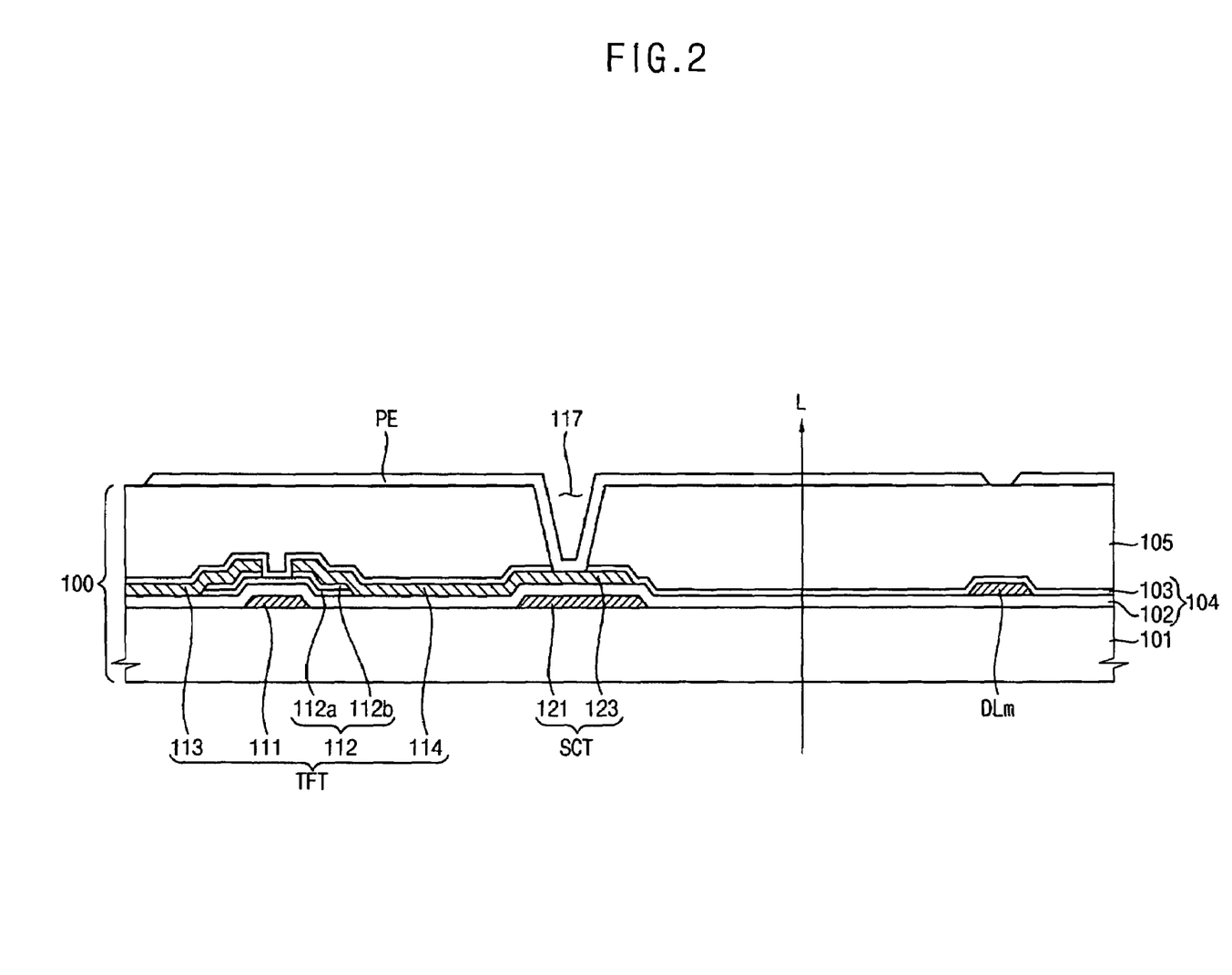
FIG. 2 is a cross-sectional view taken along the line I-I' in FIG. 1.

FIG. 2 is a cross-sectional view taken along the line I-I' in FIG. 1.

Referring to FIGS. 1 and 2, the array substrate 100 includes a base substrate 101. A gate metal pattern is formed on the base substrate 101. The gate metal pattern includes a gate line GL, a gate electrode 111 and a storage common line 121.

A gate-insulating layer 102 is on the base substrate 101 having the gate metal pattern. The gate-insulating layer 102 may include, for example, a silicon nitride (SiNx) layer having a thickness of about 3200 Å to about 3800 Å. A refractive index N of the gate-insulating layer 102 may be about 1.85. Alternatively, the gate-insulating layer 102 may include a silicon oxide (SiOx) layer.

A channel layer 112 is on the gate-insulating layer 102. The channel layer 112 includes an amorphous silicon layer 112a and an n+amorphous silicon layer 112b. For example, n+impurities may be implanted into an upper portion of the amorphous silicon layer 112a in situ to form the n+amorphous silicon layer 112b. A portion of the channel layer 112 corresponding to the gate electrode 111 is patterned.

A base substrate 101 having the channel layer 112 includes a source metal pattern. The source metal pattern includes a source line DLm, a source electrode 113, a drain electrode 114 and an electrode pattern 123.

A passivation layer 103 can be formed on the base substrate 101 having the source metal pattern. The passivation layer 103 may include, for example, a silicon nitride (SiNx) layer having a thickness of about 800 Å to about 1200 Å. A refractive index N of the passivation layer 103 may be about 1.85. Alternatively, the passivation layer 103 may include a silicon oxide (SiOx) layer.

An organic insulating layer 105 can be formed on the base substrate 101 having the passivation layer 103. The organic insulating layer 105 may have a thickness of about 2 μm to about 4.3 μm. A refractive index of the organic insulating layer 105 may be about 1.56. A thickness of the insulating layer 105 can be thicker than that of other layers of the base substrate 101. The organic insulating layer 105 may have low thickness uniformity.

A thickness of a lower insulating layer 104 formed under the organic insulating layer 105 can be adjusted to control the transmissivity of the array substrate 100. The lower insulating layer 104 includes the gate-insulating layer 102 and the passivation layer 103. That is, the thickness of the gate-insulating layer 102 and/or the thickness of the passivation layer 103 can be adjusted to compensate the thickness variation of the organic insulating layer 105.

A contact hole 117 through which the electrode pattern 123 is partially exposed is formed at the organic insulating layer 105 and the passivation layer 103. The pixel electrode PE is electrically connected to the drain electrode 114 via the contact hole 117.

Figure 3:
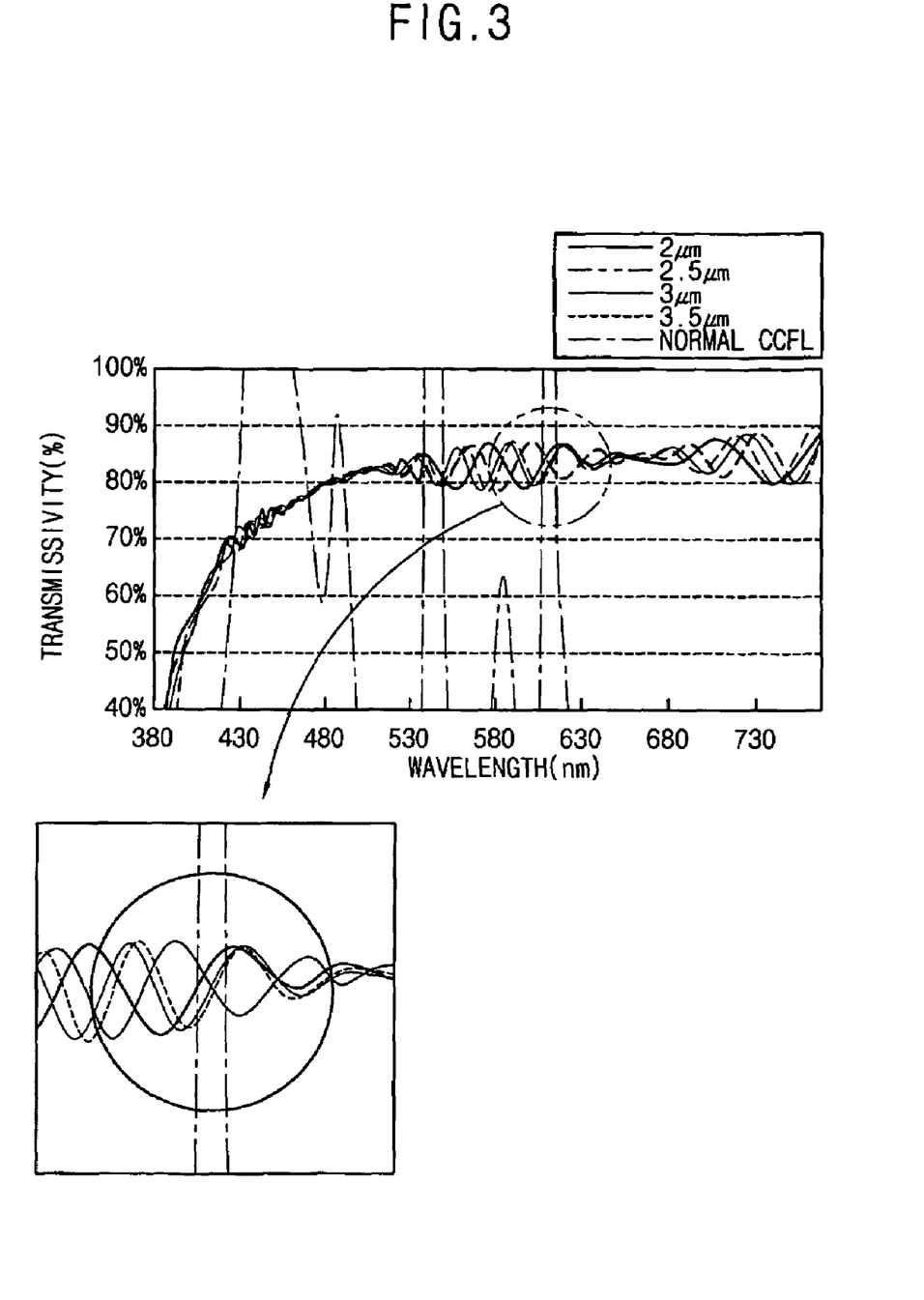
FIG. 3 is a graph illustrating a variation of transmissivity according to various thicknesses of an organic insulating layer.

FIG. 3 is a graph illustrating a variation of transmissivity according to various thicknesses of the organic insulating layer 105.

Referring to FIG. 3, visible light passing through the array substrate 100 has a wavelength of about 380 nm to about 750 nm. The visible light includes blue light, green light and red light. The blue light has a wavelength of about 400 nm to about 500 nm. The green light has a wavelength of about 530 nm to about 590 nm. The red light has a wavelength of about 600 nm to about 630 nm.

In FIG. 3, in the wavelength range of the blue light, an inclination of a transmissivity curve is smooth according to the various thicknesses of the organic insulating layer 105. That is, the transmissivity of the blue light does not depend on the thickness of the organic insulating layer 105.

In the wavelength range of the green light, an inclination of the transmissivity curve has a predetermined inclined angle according to the various thicknesses of the organic insulating layer 105. That is, the transmissivity of the green light is changed based on the thickness variation of the organic insulating layer 105.

In the wavelength range of the red light, an inclination of the transmissivity curve has a predetermined inclined angle according to the various thicknesses of the organic insulating layer 105. That is, the transmissivity of the red light is changed based on the thickness variation of the organic insulating layer 105.

The transmissivity of the red and green lights are changed based on the thickness variation of the organic insulating layer 105. When the transmissivity of the red light is changed, a reddish spot may be displayed on a screen displaying a white image.

Figure 4A:
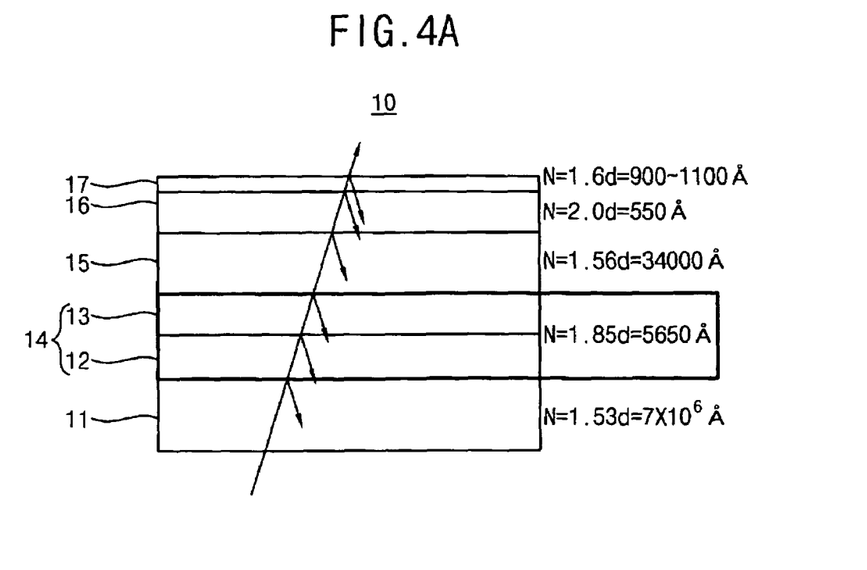
FIG. 4A is a cross-sectional view illustrating an array substrate according to an example.
Figure 4B:
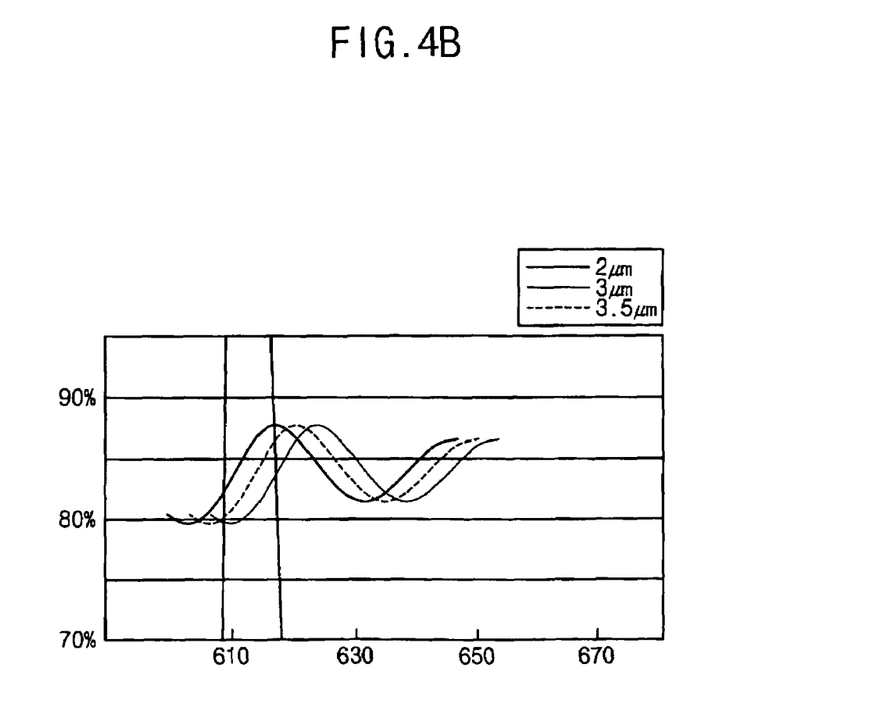
FIG. 4B is a graph illustrating a light transmissivity of the array substrate in FIG. 4A.

FIG. 4A is a cross-sectional view illustrating an array substrate 10 according to an example. FIG. 4B is a graph illustrating light transmissivity of the array substrate 10 in FIG. 4A.

The array substrate 10 includes a base substrate 11, a lower insulating layer 14, an organic insulating layer 15, a pixel electrode 16 and an alignment film 17. The lower insulating layer 14, the organic insulating layer 15, the pixel electrode 16 and the alignment film 17 are formed on the base substrate 11, in sequence. The lower insulating layer 14 includes a gate-insulating layer 12 and a protection insulating layer 13.

For example, a refractive index of the base substrate 11 is about 1.53, and a thickness of the base substrate 11 is about 7,000,000 Å. A refractive index of the lower insulating layer 14 is about 1.85, and a thickness of the lower insulating layer 14 is about 5,650 Å. A reflective index of the organic insulating layer 15 is about 1.56, and a thickness of the organic insulating layer 15 is about 34,000 Å. A refractive index of the pixel electrode is about 2.0, land a thickness of the pixel electrode 16 is about 550 Å. A refractive index of the alignment film 17 is about 1.6, and a thickness of the alignment film 17 is about 900 Å to about 1,100 Å.

When light passes through the array substrate 10, the transmissivity of the red light is changed by about 80% to about 90%.

Figure 5A:
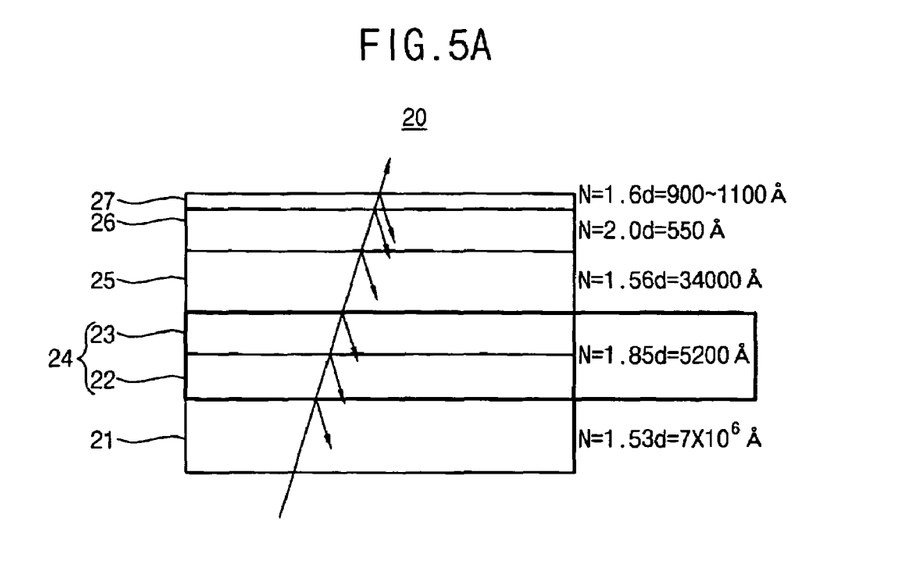
FIG. 5A is a cross-sectional view illustrating an array substrate according to an exemplary embodiment of the present invention.
Figure 5B:
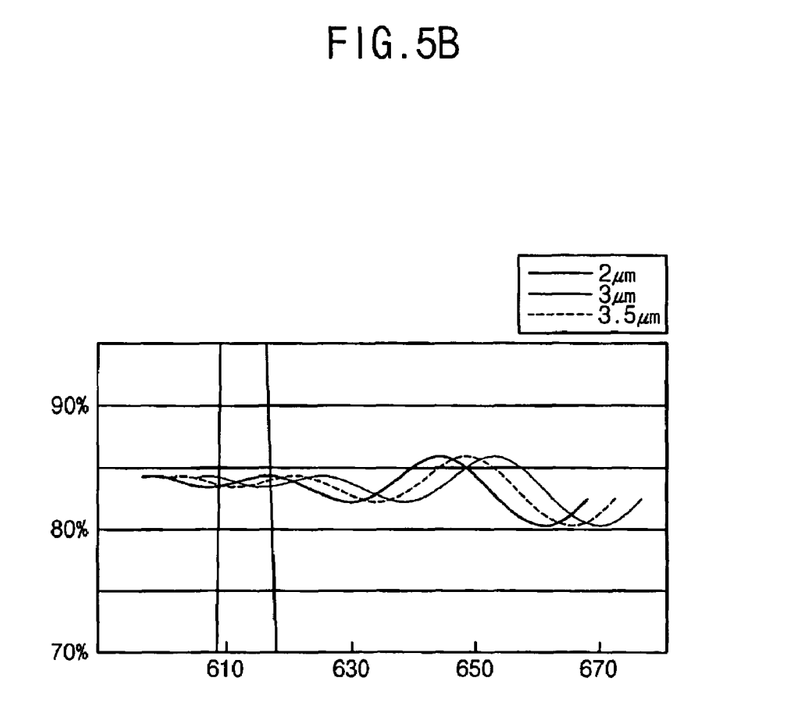
FIG. 5B is a graph illustrating a light transmissivity of the array substrate in FIG. 5A.

FIG. 5A is a cross-sectional view illustrating an array substrate 20 according to an exemplary embodiment of the present invention. FIG. 5B is a graph illustrating light transmissivity of the array substrate 20 in FIG. 5A.

The array substrate 20 includes a base substrate 21, a lower insulating layer 24, an organic insulating layer 25, a pixel electrode 26 and an alignment film 27. The lower insulating layer 24, the organic insulating layer 25, the pixel electrode 26 and the alignment film 27 are formed on the base substrate 21, in sequence. The lower insulating layer 24 includes a gate-insulating layer 22 and a protection insulating layer 23.

In an embodiment of the present invention, a refractive index of the base substrate 21 is about 1.53, and a thickness of the base substrate 21 is about 7,000,000 Å. A refractive index of the lower insulating layer 24 is about 1.85, and a thickness of the lower insulating layer 24 is about 5200 Å. A refractive index of the organic insulating layer 25 is about 1.56, and a thickness of the organic insulating layer 25 is about 34,000 Å. A refractive index of the pixel electrode 26 is about 2.0, and a thickness of the pixel electrode 26 is about 550 Å. A refractive index of the alignment film 27 is about 1.6, and a thickness of the alignment film 27 is about 900 Å to about 1,100 Å.

The lower insulating layer 24 of the array substrate 20 of FIGS. 5A and 5B has a thinner thickness than the lower insulating layer 14 of the array substrate 10 of FIGS. 4A and 4B.

When light passes through the array substrate 20 including the lower insulating layer 24 having a thinner thickness compared to the lower insulating layer 14 in the array substrate 10, the transmissivity of red light is about 84%, and is substantially uniform.

According to the array substrate 10 of FIGS. 4A and 4B and the array substrate 20 of FIGS. 5A and 5B, the thickness of the lower insulating layer 24 can be adjusted based on the thickness variation of the organic insulating layer 25 to compensate for the transmissivity variation of the wavelength of the red light. Therefore, the transmissivity uniformity of the red light is increased.

A thickness D of the lower insulating layer 24 corresponding to the red light having a peak wavelength W for minimizing the transmissivity variation is defined as the following equation 1.

$$W = \left\{ \frac{(D-4500)^N}{8000} \right\} + 618 \qquad \text{Equation 1}$$

In the above equation 1, the unit of the wavelength W is nm, the unit of the thickness D is Å and N represents a refractive index of the lower insulating layer 24.

FIGS. 6 to 9 are plan views illustrating a manufacturing method of an array substrate 100 in FIG. 1 according to an embodiment of the present invention.

Figure 6:
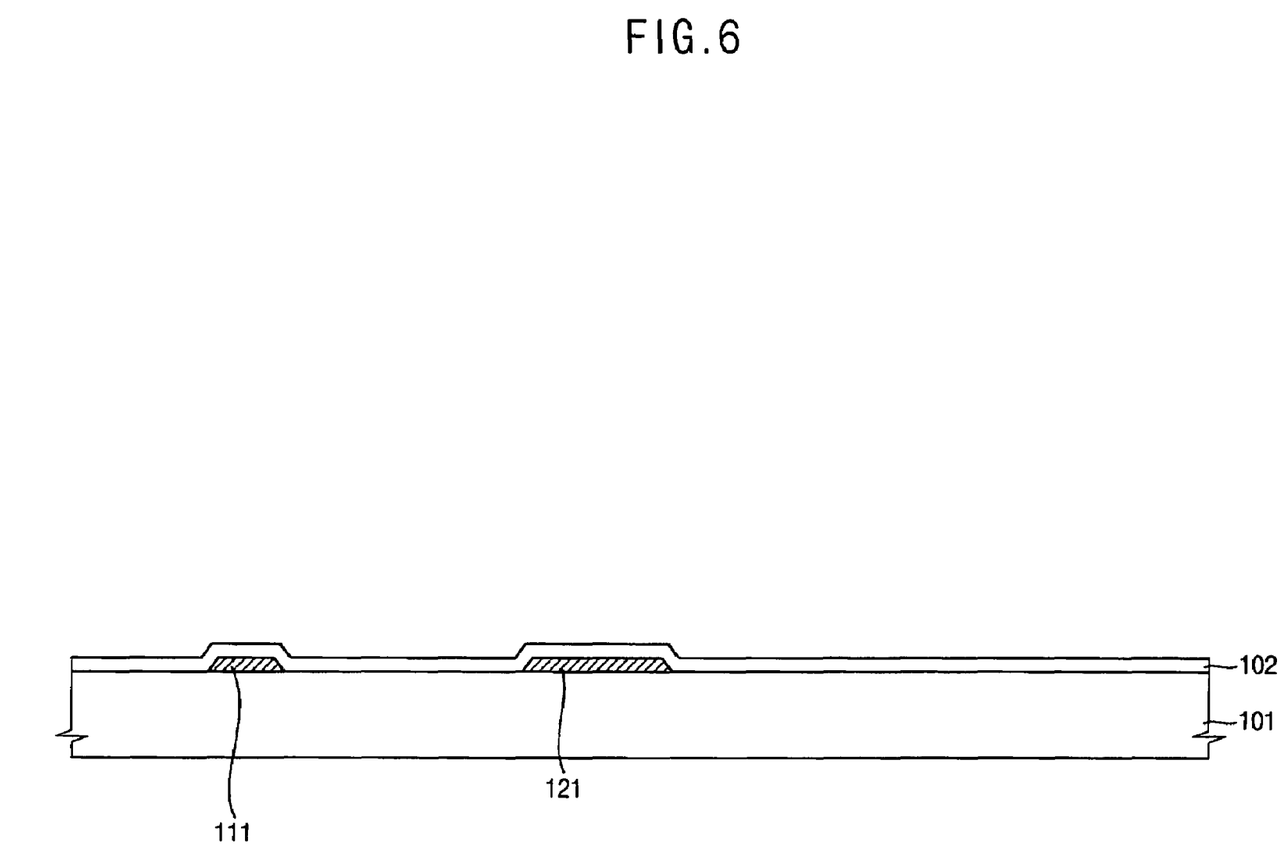
FIGS. 6 to 9 are plan views illustrating a manufacturing method of an array substrate according to an embodiment of the present invention.

Referring to FIGS. 1 and 6, a gate metal layer is deposited and patterned on the base substrate 101 to form a gate metal pattern. The gate metal pattern includes the gate lines GLn-1 and GLn, the storage common line 121 and the gate electrode 111.

The gate-insulating layer 102 is disposed on the base substrate 101 having the gate metal pattern. In an embodiment of the present invention, the gate-insulating layer 102 includes an insulating material such as, for example, silicon nitride (SiNx), and a thickness of the gate-insulating layer 102 is about 3,200 Å to about 3,800 Å.

Figure 7:
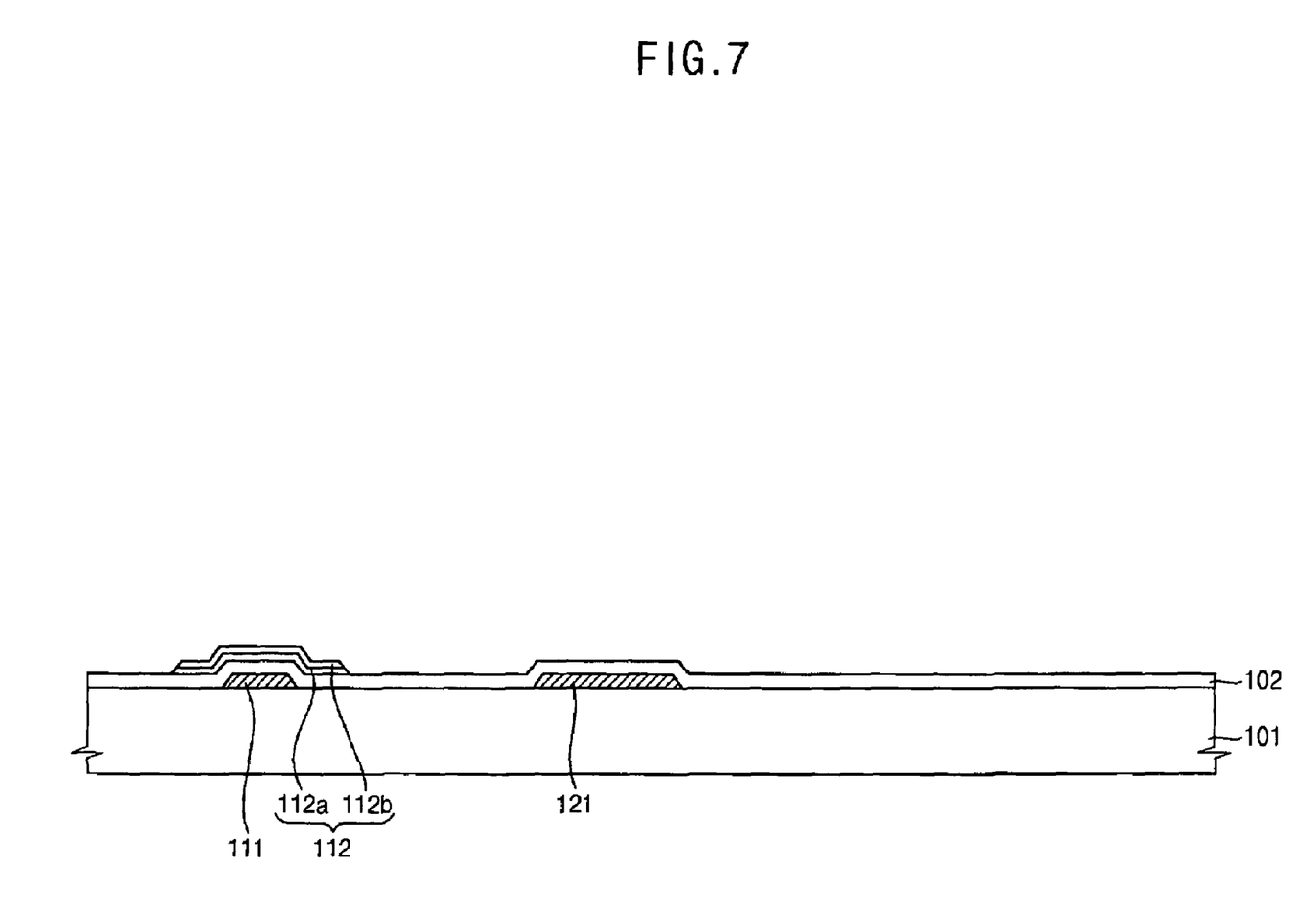

Referring to FIGS. 1 and 7, the channel layer 112 is formed on the gate-insulating layer 102. In an embodiment of the present invention, a base amorphous silicon layer and a base n+amorphous silicon layer are formed on the gate-insulating layer 102, in sequence. The base amorphous silicon layer and the base n+amorphous silicon layer are patterned to form the channel layer 112 on the gate-insulating layer 102 corresponding to the gate electrode 111. The channel layer 112 includes the amorphous silicon layer 112a and the n+amorphous silicon layer 112b.

Figure 8:
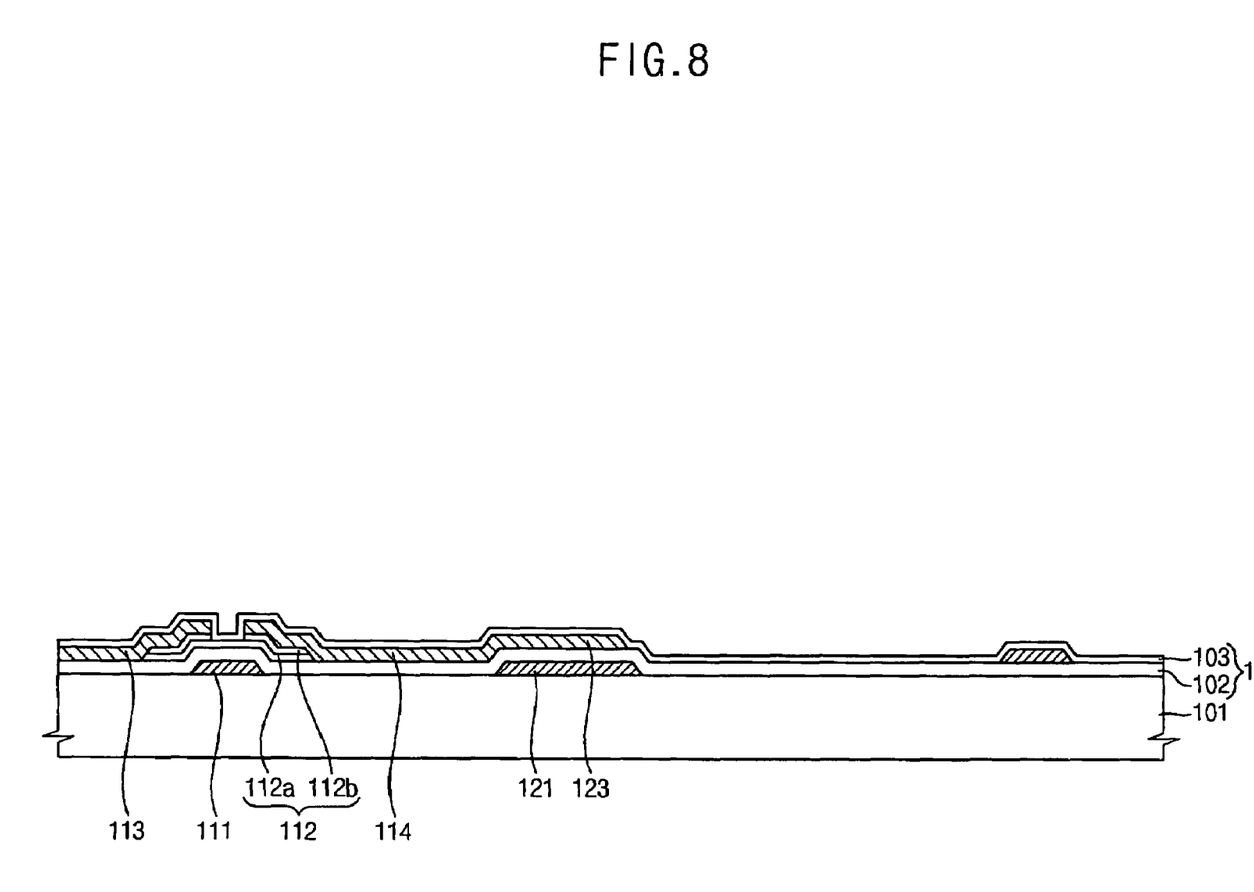

Referring to FIGS. 1 and 8, a data metal layer is deposited and patterned on the channel layer 112 to form a source metal pattern.

The source metal pattern includes the source lines DLm-1 and DLm, the source electrode 113, the drain electrode 114 and the electrode pattern 123 of the storage capacitor CST.

A portion of the n+amorphous silicon layer 112b of the channel layer 112 between the source and drain electrodes 113 and 114 is removed using the source and drain electrodes 113 and 114 as a mask to define a channel portion of the switching element TFT.

The passivation layer 103 is formed on the base substrate 101 having the source metal pattern. The passivation layer 103 may include an insulating material such as, for example, silicon nitride (SiNx), and a thickness of the passivation layer 103 may be about 800 Å to about 1,200 Å.

A thickness of the lower insulating layer 104 that includes the gate-insulating layer 102 and passivation layer 103 is determined based on a peak wavelength of red light passing through the array substrate 100. In an embodiment of the present invention, the thickness of the gate insulating layer 102 may be a minimum value based on electrical characteristics of the switching element TFT. In an embodiment in connection with FIG. 7, the thickness of the passivation layer 103 can be controlled based on the peak wavelength of the red light to increase the transmissivity uniformity.

Thus, the thickness D of the lower insulating-layer 104 is determined by the Equation 1 based on the peak wavelength of the red light.

Figure 9:
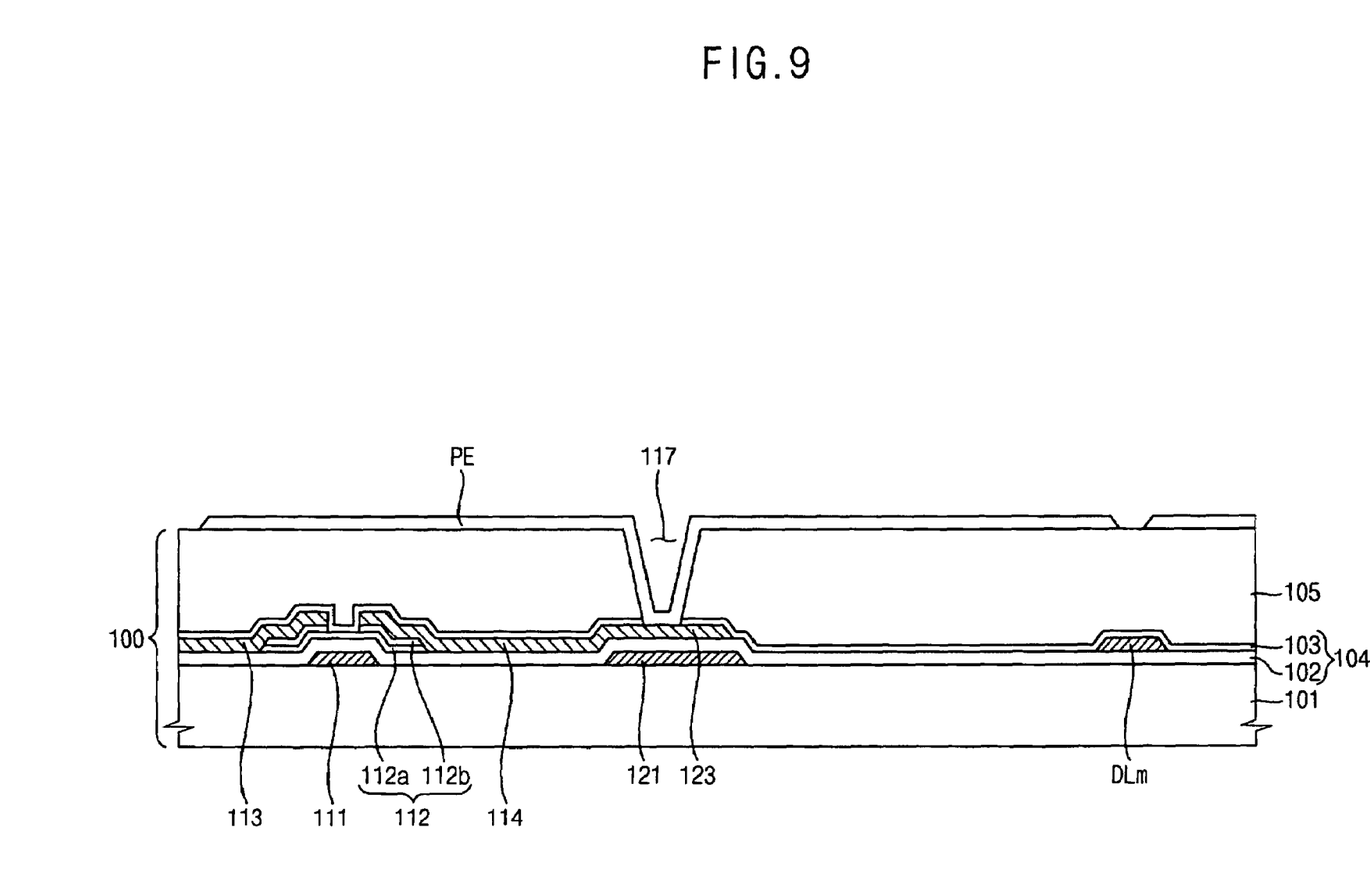

Referring to FIGS. 1 and 9, the organic insulating layer 105 is formed on the base substrate 101 having the passivation layer 103. In an embodiment of the present invention, a thickness of the organic insulating layer 105 is about 2 μm to about 4.3 μm, and a refractive index of the organic insulating layer 105 is about 1.56. The organic insulating layer 105 can be thicker than other layers of the base substrate 101. When the organic insulating layer 105 does not have a uniform thickness, the transmissivity uniformity of a display panel may be decreased.

The lower insulating layer 104 having the thickness D depending on the peak wavelength W of the red light compensates the variation of the transmissivity caused by the thickness variation of the organic insulating layer 105.

The contact hole 117 through which the drain electrode 114 is partially exposed is formed at the organic insulating layer 105 and the passivation layer 103.

A transparent conductive material layer is deposited and patterned on the base substrate 101 having the contact hole 117 to form the pixel electrode PE. Examples of the transparent conductive material that can be used for the pixel electrode PE include indium tin oxide (ITO), indium zinc oxide (IZO), and indium tin zinc oxide (ITZO).

The pixel electrode PE can partially overlap a portion of the source lines DLm-1 and DLm so that a size of the pixel electrode PE can be maximized to increase the transmissivity of the light passing via the pixel electrode PE.

According to the array substrate 100 shown in FIGS. 1, 6, 7, 8, 9 and 10, the thickness D of the lower insulating layer 104 disposed under the organic insulating layer 105 is determined based on the peak wavelength of the red light to decrease the variation of the transmissivity caused by the thickness variation of the organic insulating layer 105, thereby improving image display quality.

Figure 10:
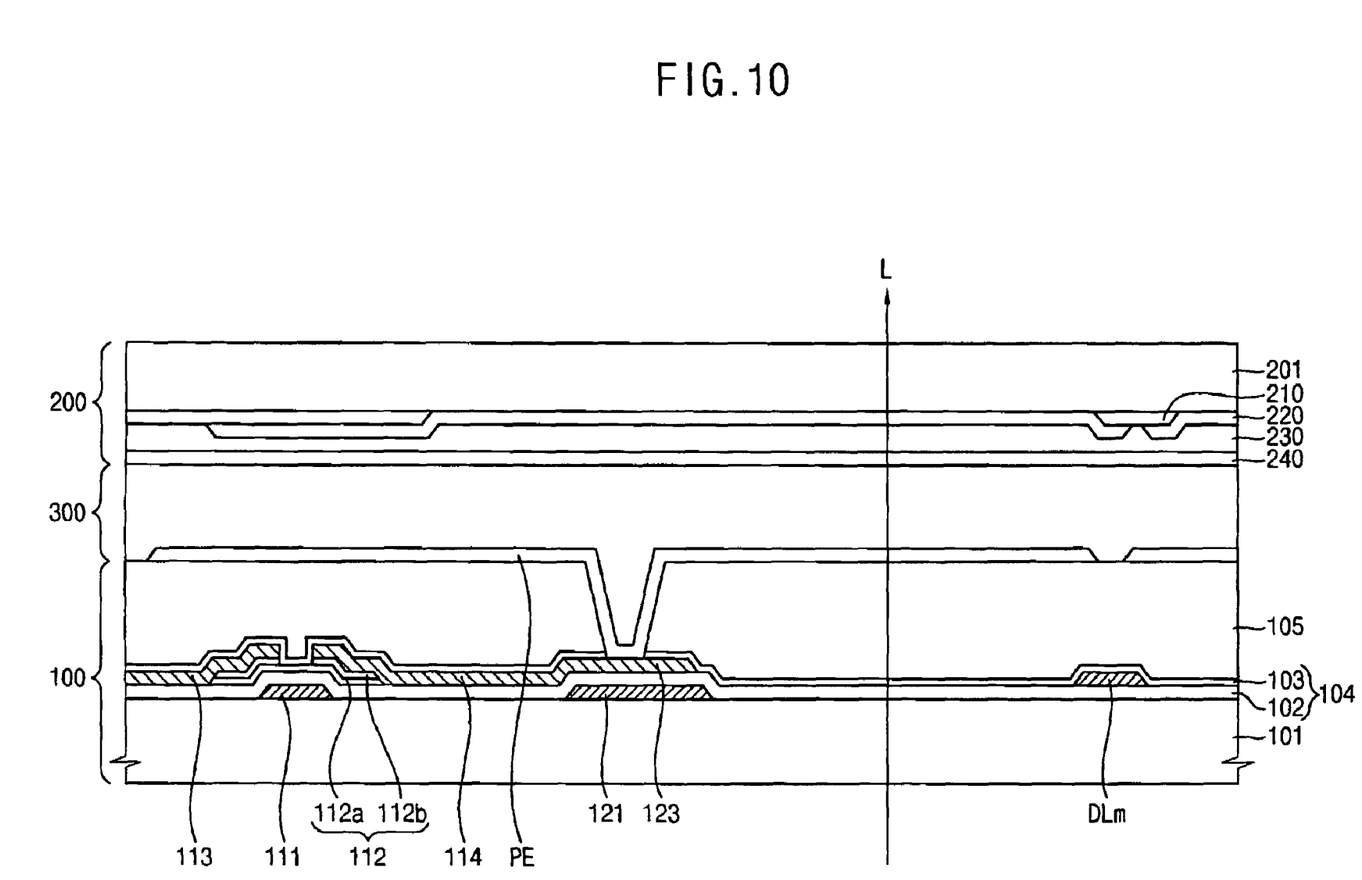
FIG. 10 is a cross-sectional view illustrating a liquid crystal display (LCD) panel according to an exemplary embodiment of the present invention.

FIG. 10 is a cross-sectional view illustrating a liquid crystal display (LCD) panel according to an embodiment of the present invention.

Referring to FIG. 10, the LCD panel includes the array substrate 100, an opposite substrate 200 and a liquid crystal layer 300.

Referring to Equation 1, a thickness D of the lower insulating-layer 104 disposed under the organic insulating layer 105 of the array substrate 100 is determined based on a peak wavelength W of red light provided from a bottom surface of the array substrate 100.

The lower insulating layer 104 having the thickness D determined by the Equation 1 compensates a transmissivity variation caused by a thickness variation of the organic insulating layer 105. Thus, reddish spots are decreased on the LCD panel.

The opposite substrate 200 includes a base substrate 201, a light blocking layer 210, a color filter layer 220, an over coating layer 230 and a common electrode layer 240. The light blocking layer 210, the color filter layer 220, the over coating layer 230 and the common electrode layer 240 are formed on the base substrate 201.

The light blocking layer 210 corresponds to the gate lines GLn-1 and GLn, the source lines DLm-1 and DLm and the switching element TFT, and blocks a portion of light having passed through the array substrate 100 and the liquid crystal layer 300.

The color filter layer 220 includes color filter patterns corresponding to pixel regions of the array substrate 100. The color filter patterns include red (R), green (G) and blue (B) filter patterns.

The over coating layer 230 is formed on the color filter layer 220 to protect the color filter layer 220 and to planarize the opposite substrate 200.

The common electrode layer 240 faces the pixel electrode PE of the array substrate 100. The pixel electrode PE, the liquid crystal layer 300 and the common electrode layer 240 define a liquid crystal capacitor.

The liquid crystal layer 300 is interposed between the array substrate 100 and the opposite substrate 200. Liquid crystals of the liquid crystal layer 300 vary arrangement in response to an electric field applied thereto, and thus light transmittance of the liquid crystal layer 300 is changed, thereby displaying an image.

Figure 11:
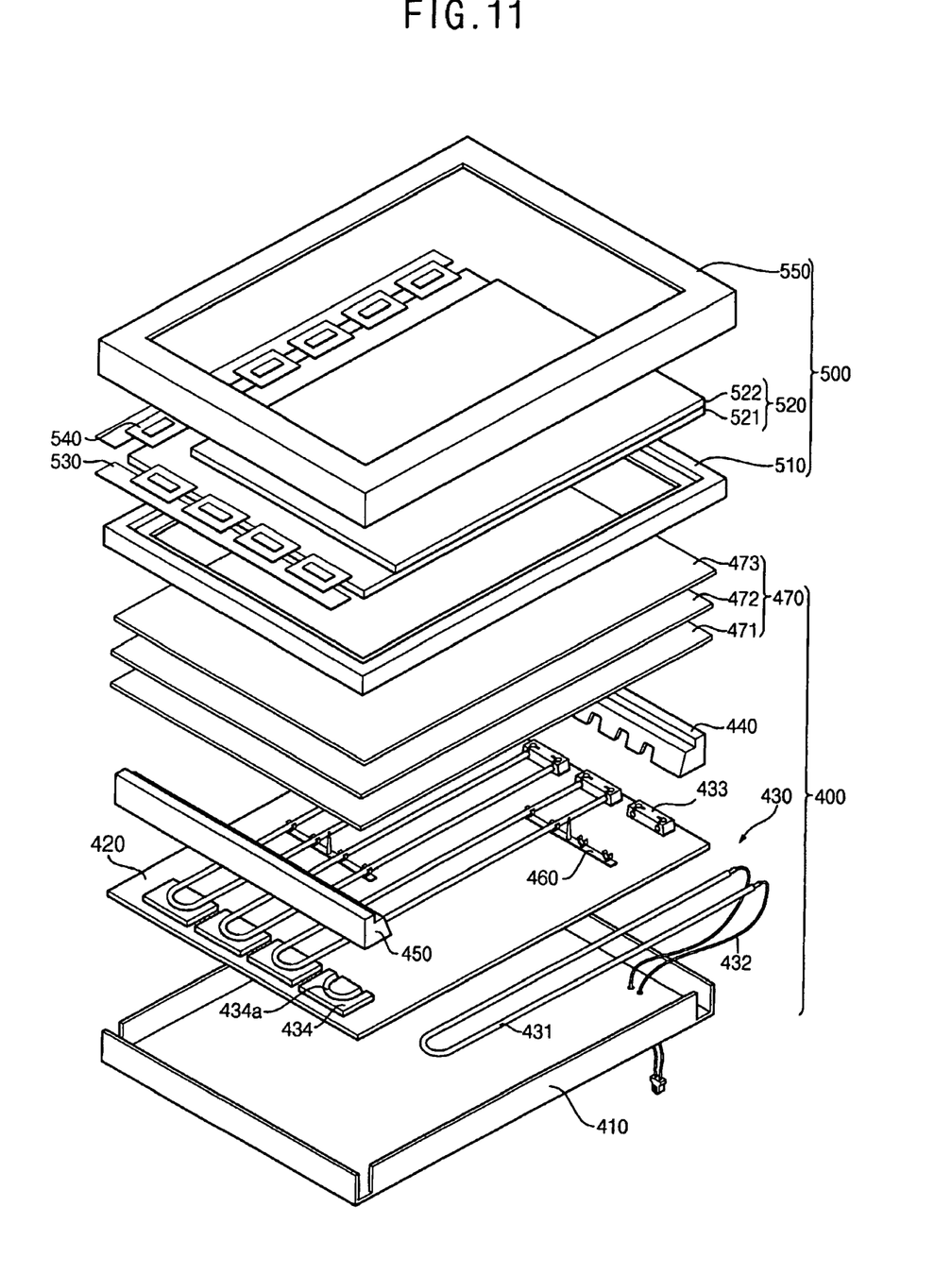
FIG. 11 is an exploded perspective view illustrating an LCD panel according to an exemplary embodiment of the present invention.

FIG. 11 is an exploded perspective view illustrating an LCD panel according to an embodiment of the present invention.

Referring to FIG. 11, the LCD device includes a backlight assembly 400 and a display assembly 500.

The backlight assembly 400 includes a receiving container 410, a reflecting plate 420, a lamp assembly 430, frame parts 440, 450 and 460, and an optical member 470. The receiving container 410 receives the reflecting plate 420, the lamp assembly 430, frame parts 440, 450 and 460, and the optical member 470. The lamp assembly 430 includes a lamp 431, a lamp wire 432, a lamp holder 433 and a lamp fixing member 434.

The lamp 431 may include, for example, a cold cathode fluorescent lamp (CCFL) having an electrode. A fluorescent layer can be formed on an inner surface of the lamp 431. The lamp 431 is filled with a discharge gas. Examples of the discharge gas include mercury (Hg), argon (Ar), neon (Ne), xenon (Xe), and krypton (Kr).

When a driving voltage is applied to the electrode of the CCFL, the discharge gas is discharged to generate invisible light. The invisible light may be, for example, ultraviolet light. The ultraviolet light can be changed into visible light by red, green and blue fluorescent layers of the fluorescent layer formed in the inner surface of the lamp 431.

In FIGS. 6 to 11, the LCD panel of the display assembly can be manufactured based on the peak wavelength W of the red light that is generated from the red (R) fluorescent layer. Alternatively, the LCD panel may be manufactured based on a peak wavelength of green light or blue light. In an embodiment of the present invention, a thickness D of a lower insulating layer formed on an array substrate of the LCD panel is determined by the Equation 1 using the peak wavelength W of the red light generated from the lamp 431.

The lamp wire 432 is electrically connected to the electrode of the lamp 431 to apply a driving voltage to the electrode of the lamp 431. The lamp holder 433 holds a first end portion of the lamp 431, and includes a guiding hole (not shown) for guiding the lamp wire 432 and a fixing protrusion (not shown) for fixing the lamp holder 433 to the receiving container 410. The lamp fixing member 434 fixes a second end portion of the lamp 431 to the receiving container 410, and includes a fixing groove 434a having a shape corresponding to the second end portion of the lamp 431.

The frame parts 440, 450 and 460 include a first side mold 440, a second side mold 450 and a lamp supporting member 460. The first side mold 440 covers the lamp holder 433 to cover the first end portion of the lamp 431, and supports the optical member 470. The second side mold 450 covers the lamp fixing member 434 to cover the second end portion of the lamp 431, and supports the optical member 470.

The optical member 470 includes a diffusion plate 471 and brightness enhancement sheets 472 and 473. The diffusion plate 471 diffuses the light generated from the lamp 431 to enhance luminance uniformity of the light.

The display assembly 500 includes a middle mold 510, an LCD panel 520, a printed circuit board 530, a flexible circuit board 540 and a top chassis 550.

The middle mold 510 is formed on the receiving container 410 having the optical member 470. The middle mold 510 presses a peripheral portion of the optical member 470 disposed on the first and second side molds 440 and 450 to fix the optical member 470 to the receiving container 410.

The LCD panel 520 includes the array substrate 100, an opposite substrate 200 opposite to the array substrate 100 and a liquid crystal layer (not shown) interposed between the array and opposite substrates 100 and 200.

A thickness D of the lower insulating layer 104 under the organic insulating layer 105 of the array substrate 100 can be determined based on a peak wavelength W of red light from the backlight assembly 400 using the Equation 1. The lower insulating layer 104 having the thickness D determined by the Equation 1 compensates the transmissivity variation caused by a thickness variation of the organic insulating layer 105. Thus, reddish spots caused by the transmissivity variation are decreased from a screen displaying a white image.

The printed circuit board 530 includes a driving circuit unit (not shown). The driving circuit unit generates a driving control signal and an image signal to the LCD panel 520 based on an externally provided image signal and an externally provided control signal to drive the LCD panel 520.

The flexible circuit board 540 electrically connects the LCD panel 520 to the printed circuit board 530. The flexible circuit board 540 outputs driving signals to the LCD panel 520 based on the image signal and the driving control signal from the printed circuit board 530.

The top chassis 550 covers a peripheral portion of the LCD panel 520, and is combined with the receiving container 410. The top chassis 550 protects the LCD panel 520 from an externally provided impact to prevent damage and breakage of the LCD panel 520. The top chassis 550 fixes the LCD panel 520 to the receiving container 410 to prevent a drift of the LCD panel 520.

Figure 12:
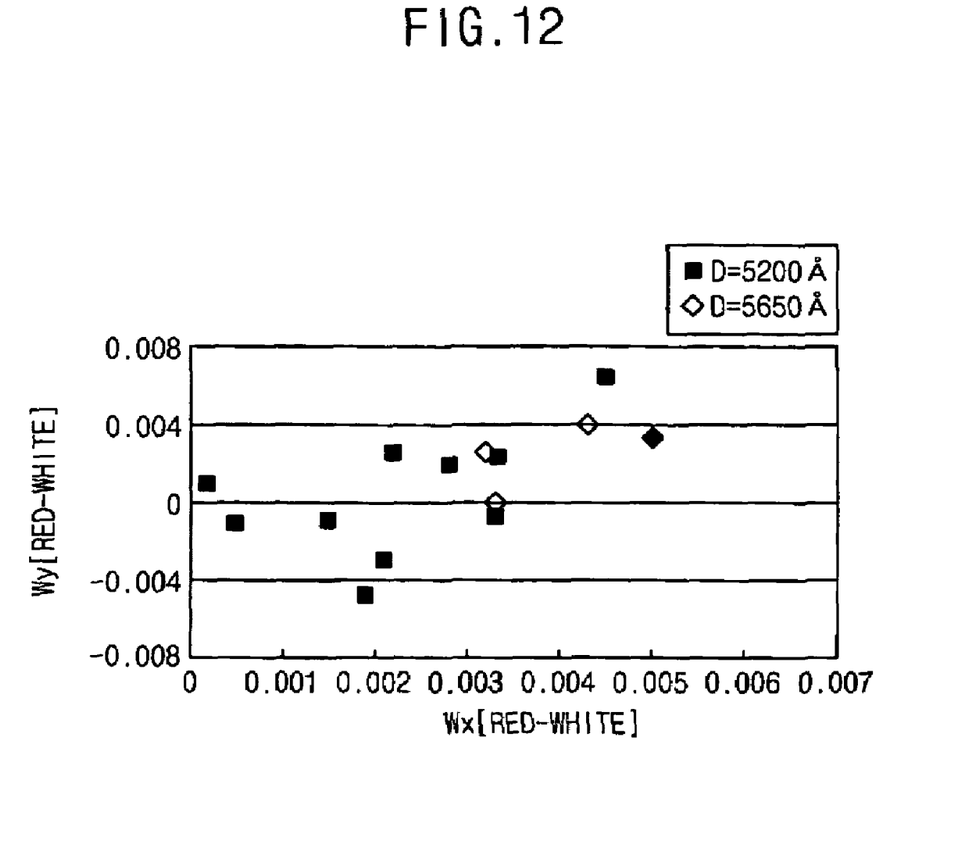
FIG. 12 is a graph illustrating an improved effect of image display quality according to an exemplary embodiment of the present invention.

FIG. 12 is a graph illustrating an improved effect of image display quality according to an exemplary embodiment of the present invention.

In FIG. 12, red light having a wavelength of about 614 nm is incident into an LCD panel to display a white image. The graph of FIG. 12 illustrates a difference of color coordinates (Wx, Wy) between a red spot and a white spot on the LCD panel with respect to various thicknesses Ds of the lower insulating layer 104 of the LCD panel.

In an embodiment of the present invention, when the thickness D of the lower insulating layer 104 of the LCD panel is about 5,600 Å, a difference of x coordinates between the red and white spots is about 0.003 to about 0.006. When a thickness D of the lower insulating layer 104 is about 4,600 Å, the difference of the x coordinates between the red and white spots is less than about 0.003. In FIG. 12, uniformity of the image displayed on the LCD panel is improved, as an absolute value of the difference of the x coordinates between the red and white spots is decreased. The uniformity of the image displayed on the LCD panel is decreased, as the absolute value of the difference of the x coordinates between the red and white spots is increased.

That is, when the peak wavelength W of the red light and the thickness D of the lower insulating layer 104 are about 614 nm and 4,600 Å that is determined by the Equation 1, respectively, the difference of each of x and y coordinates between the red and white spots is less than about 0.003. Therefore, the thickness D of the lower insulating layer of the LCD panel is determined based on the peak wavelength of the red light, thereby decreasing the spot defects.

According to an embodiment of the present invention, the thickness of the lower insulating layer 104 is determined based on the peak wavelength of the red light. Thus, variation of light transmissivity caused by the thickness variation of the organic insulating layer 105 of the LCD panel is decreased.

Therefore, according to an embodiment of the present invention, the transmissivity variation of the LCD panel is decreased so that the image display quality can be improved.

Although exemplary embodiments have been described with reference to the accompanying drawings, it is to be understood that the present invention is not limited to these precise embodiments but various changes and modifications can be made by one skilled in the art without departing from the spirit and scope of the present invention. All such changes and modifications are intended to be included within the scope of the invention as defined by the appended claims.

What is claimed is:

1. An array substrate including a plurality of pixel regions transmitting light, comprising:
    a switching element electrically connected to gate and source lines;
    a pixel electrode electrically connected to the switching element;
    a first insulating layer disposed on the switching element; and
    a second insulating layer disposed under the first insulating layer,
    wherein a relationship between a thickness D of the second insulating layer and the peak wavelength W of the red light approximates to the following equation:
    $W = \{(D-4500)^N/8000\} + 618$ wherein, N represents a refractive index of the second insulating layer, and the unit of the peak wavelength W of the red light and the unit of the thickness D of the second insulating layer are nm and Å, respectively.

2. The array substrate of claim 1, wherein the second insulating layer comprises:
    a gate-insulating layer on the gate lines; and
    a passivation layer on the source lines.

3. The array substrate of claim 2, wherein the second insulating layer has a contact hole through which the switching element is electrically connected to the pixel electrode.

4. The array substrate of claim 2, wherein the gate-insulating layer comprises silicon nitride.

5. The array substrate of claim 2, wherein the passivation layer comprises silicon nitride.

6. The array substrate of claim 5, wherein a thickness of the passivation layer is about 800 Å to about 1,200 Å.

7. The array substrate of claim 1, wherein the thickness of the second insulating layer is about 4,000 Å to about 5,000 Å.

8. A liquid crystal display panel for displaying an image using light comprising:

an array substrate including a switching element electrically connected to gate and source lines, a first insulating layer on the switching element, and a second insulating layer disposed under the first insulating layer, wherein a relationship between a thickness D of the second insulating layer and the peak wavelength W of the red light approximates to the following equation:

$W=\{(D-4500)^N/8000\}+618$ wherein, N represents a refractive index of the second insulating layer, and the unit of the peak wavelength W of the red light and the unit of the thickness D of the second insulating layer are nm and Å, respectively; and an opposite substrate combined with the array substrate to receive a liquid crystal layer between the array substrate and the opposite substrate.

9. The liquid crystal display panel of claim 8, wherein the second insulating layer comprises a gate-insulating layer on the gate lines; and a passivation layer on the source lines.

10. The liquid crystal display panel of claim 9, wherein the gate-insulating layer comprises silicon nitride.

11. The liquid crystal display panel of claim 9, wherein the passivation layer comprises silicon nitride.

12. The liquid crystal display panel of claim 8, wherein a thickness of the passivation layer is about 800 Å to about 1,200 Å.

13. The liquid crystal display panel of claim 8, wherein the opposite substrate comprises color filter patterns.

14. The array substrate of claim 8, wherein the thickness of the second insulating layer is about 4,000 Å to about 5,000 Å.

15. A liquid crystal display device comprising:
a light source generating light; and
a liquid crystal display panel including:
an array substrate having a switching element electrically connected to gate and source lines, a first insulating layer on the switching element, and a second insulating layer disposed under the first insulating layer, wherein a relationship between a thickness D of the second insulating layer and the peak wavelength W of the red light approximates to the following equation:

$W=\{(D-4500)^N/8000\}+618$ wherein, N represents a refractive index of the second insulating layer, and the unit of the peak wavelength W of the red light and the unit of the thickness D of the second insulating layer are nm and Å, respectively; and an opposite substrate combined with the array substrate to receive a liquid crystal layer between the array substrate and the opposite substrate.

16. The liquid crystal display device of claim 15, wherein the second insulating layer comprises a gate-insulating layer on the gate lines; and a passivation layer on the source lines.

17. The liquid crystal display device of claim 16, wherein the gate-insulating layer comprises silicon nitride.

18. The liquid crystal display device of claim 16, wherein the passivation layer comprises silicon nitride.

19. The liquid crystal display device of claim 18, wherein a thickness of the passivation layer is about 800 Å to about 1,200 Å.

20. The liquid crystal display device of claim 15, wherein the thickness of the second insulating layer is about 4,000 Å to about 5,000 Å.

21. An array substrate including a plurality of pixel regions transmitting light, comprising:
a switching element electrically connected to gate and source lines; a pixel electrode electrically connected to the switching element; a first insulating layer disposed on the switching element; and
a second insulating layer disposed under the first insulating layer, wherein a relationship between a thickness D of the second insulating layer and the peak wavelength W of the red light approximates to the following equation:

$W=\{(D-4500)^N/8000\}+618$ wherein, N represents a refractive index of the second insulating layer, and the unit of the peak wavelength W of the red light and the unit of the thickness D of the second insulating layer are nm and Å, respectively.

22. The array substrate of claim 21, wherein the second insulating layer includes a gate-insulating layer on the gate lines; and a passivation layer on the source lines.

23. The array substrate of claim 22, wherein the gate-insulating layer comprises silicon nitride.

24. The array substrate of claim 22, wherein the passivation layer comprises silicon nitride.

25. The array substrate of claim 24, wherein a thickness of the passivation layer is about 800 Å to about 1,200 Å.

26. The array substrate of claim 21, wherein the thickness of the second insulating layer is about 4,000 Å to about 5,000 Å.

* * * * *